United States Patent
Lim et al.

(10) Patent No.: US 11,757,383 B2
(45) Date of Patent: Sep. 12, 2023

(54) APPARATUS FOR CONTROLLING VARIABLE MAGNETIC FLUX MOTOR

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Myung Seop Lim, Seoul (KR); Jae Hyun Kim, Seoul (KR); Sung Woo Hwang, Seoul (KP); Soo Hwan Park, Seoul (KR); Dong Min Kim, Incheon (KR); Sang Jin Park, Gyeonggi-do (KR); Jong Seok Lee, Gyeonggi-do (KR); Jin Ho Choi, Gyeonggi-do (KR)

(73) Assignees: Hyundai Motor Company, Seoul (KR); Kia Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 8 days.

(21) Appl. No.: 17/544,736

(22) Filed: Dec. 7, 2021

(65) Prior Publication Data
US 2022/0329178 A1    Oct. 13, 2022

(30) Foreign Application Priority Data
Apr. 12, 2021    (KR) .......................... 10-2021-0047196

(51) Int. Cl.
*H02P 5/46*    (2006.01)
*H02P 27/06*    (2006.01)

(52) U.S. Cl.
CPC ................ *H02P 5/46* (2013.01); *H02P 27/06* (2013.01); *H02P 2207/055* (2013.01)

(58) Field of Classification Search
CPC ...... H02P 1/00; H02P 1/04; H02P 1/24; H02P 1/26; H02P 1/42; H02P 1/46; H02P 1/54; H02P 6/04; H02P 6/08; H02P 6/14; H02P 6/28; H02P 21/00; H02P 21/20; H02P 21/22; H02P 23/00; H02P 25/062; H02P 25/064; H02P 25/022; H02P 27/00; H02P 27/04; H02P 27/06; H02P 2207/05
See application file for complete search history.

(56) References Cited

U.S. PATENT DOCUMENTS

| | | | |
|---|---|---|---|
| 8,067,873 B2 * | 11/2011 | Nam | ...................... H02K 1/276 310/156.83 |
| 2018/0115204 A1 * | 4/2018 | Gieras | ...................... H02P 6/08 |

FOREIGN PATENT DOCUMENTS

| | | | | |
|---|---|---|---|---|
| EP | 2146419 A1 * | 1/2010 | .......... F04C 18/3564 |
| WO | WO-2011108363 A1 * | 9/2011 | ............. H02K 1/223 |

* cited by examiner

*Primary Examiner* — Antony M Paul
(74) *Attorney, Agent, or Firm* — Fox Rothschild LLP (57) ABSTRACT

An apparatus for controlling a variable magnetic flux motor, wherein the variable magnetic flux motor includes a rotor in which a permanent magnet and a conductor bar are arranged, includes an inverter configured to apply a stator current to a stator coil of the motor, and a control unit configured to control a torque of the conductor bar and magnetize or demagnetize the permanent magnet by controlling the stator current through the inverter.

8 Claims, 6 Drawing Sheets

APPARATUS FOR CONTROLLING VARIABLE MAGNETIC FLUX MOTOR

CROSS-REFERENCE TO RELATED APPLICATION

This application claims under 35 U.S.C. § 119(a) the benefit of Korean Patent Application No. 10-2021-0047196, filed on Apr. 12, 2021, the entire contents of which are incorporated herein by reference.

BACKGROUND

(a) Technical Field

The present disclosure relates to a motor control apparatus, more particularly, to the motor control apparatus for controlling a motor including a rotor in which permanent magnets and conductor bars are arranged.

(b) Description of the Related Art

Generally, a hybrid vehicle or an electric vehicle, each of which may be referred to as an eco-friendly vehicle, is driven by an electric motor (hereinafter, referred to as a motor) which obtains torque using electric energy.

Motors are divided into a direct current (DC) motor and an alternating current (AC) motor, and AC motors are divided into a synchronous motor and an induction motor. Among synchronous motors, a permanent magnet synchronous motor including permanent magnets in a rotor is generally used.

Figure 1A:
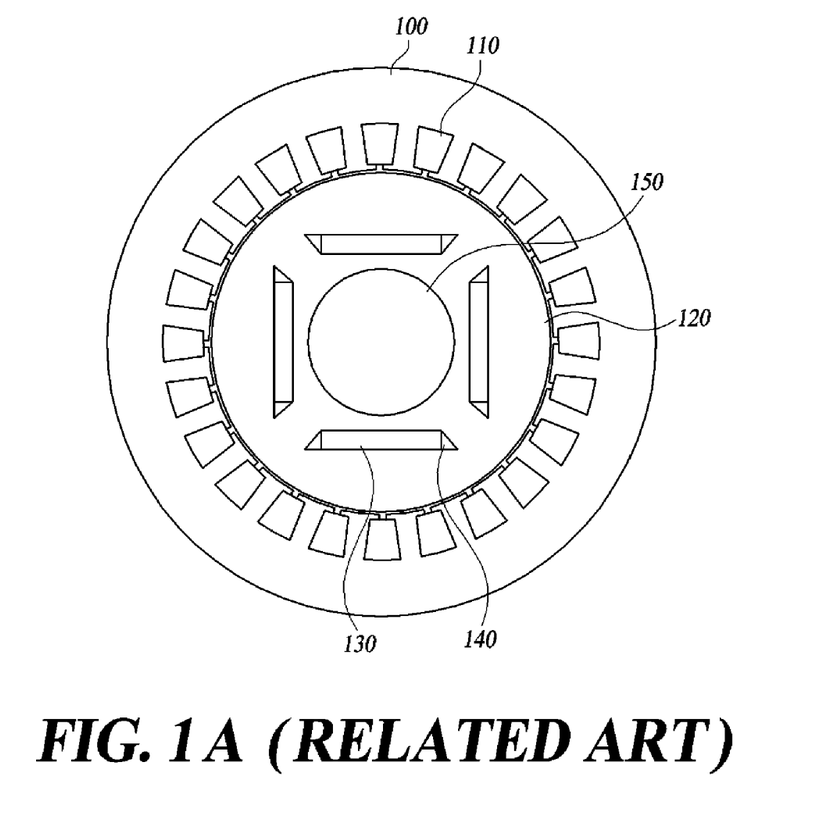
FIGS. 1A and 1B (RELATED ART) are views exemplarily illustrating structures of a synchronous motor and an induction motor.
Figure 1B:
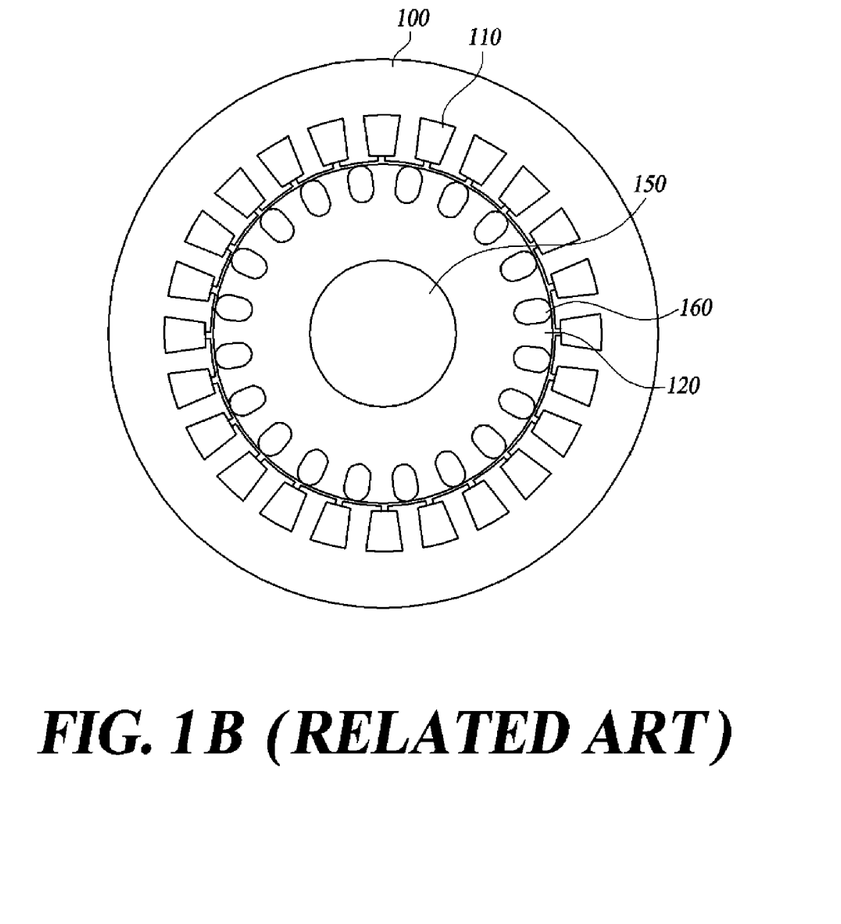

FIGS. 1A and 1B (RELATED ART) are views exemplarily illustrating structures of a synchronous motor and an induction motor.

Referring to FIG. 1A, the synchronous motor includes a stator 100, a stator slot 110, a rotor 120, a permanent magnet 130, a hole 140, and a shaft 150.

The stator 100 is configured to receive AC current from an external inverter to form a rotating magnetic field. The rotating magnetic field refers to a magnetic field which rotates around a shaft of the motor.

The stator 100 includes a stator core and a stator coil, and the stator coil is wound on the stator core through the stator slot 110. A plurality of pairs of such stator coils are provided, and one pair of stator coils refers to stator coils located on mutually opposite sides on the basis of the shaft 150. AC current applied to the plurality of pairs of stator coils forms a rotating magnetic field.

The rotor 120 is configured to rotate around the shaft 150 due to the rotating magnetic field formed by the stator 100.

The permanent magnet 130 has a magnetic pole and generates torque by interacting with the rotating magnetic field formed by the stator 100. The torque generated by the interaction between the permanent magnet 130 and the rotating magnetic field rotates the rotor 120.

The hole 140 refers to a space formed to have a V shape to allow the permanent magnets 130 to be located at certain angles. The hole 140 may not be included in the synchronous motor.

The shaft 150 refers to a driving shaft which rotates while being coupled to the rotor 120.

Referring to FIG. 1B, the induction motor includes a stator 100, a stator slot 110, a rotor 120, a shaft 150, and a conductor bar 160.

While the synchronous motor includes the permanent magnets 130 and the holes 140 in the rotor 120, the induction motor includes the conductor bars 160 in the rotor 120. The conductor bar 160 may be formed to have a cage form (for example, a squirrel cage similar to a hamster wheel) in the rotor 120 of the induction motor. That is, the cage includes axial conductor bars 160 spaced at certain angles on an outer circumference of the rotor 120 and further includes end rings connecting ends of the conductor bars 160.

Like the synchronous motor, in the induction motor, AC current provided to stator coils also forms a rotating magnetic field in the rotor 120. On the other hand, the rotating magnetic field in the induction motor induces current in the conductor bars 160. The current induced in the conductor bars 160 forms a magnetic field. The magnetic field generated by the conductor bars 160 and the rotating magnetic field generated by the stator 100 interact with each other and generate torque in the rotor 120. The rotor 120 rotates due to the generated torque. The generated torque is called Lorentz force.

When it is necessary to induce current in the conductor bars 160, a slip is needed between the conductor bars 160 and the rotating magnetic field. That is, the torque is generated when the conductor bars 160 do not rotate synchronously with the rotating magnetic field. Accordingly, the induction motor may be referred to as an asynchronous motor.

Hereinafter, a permanent magnet synchronous motor (PMSM) and the induction motor are compared.

The PMSM has high power characteristics due to high torque density in comparison to an inertial force and has high efficiency characteristics because there is no winding in the rotor 120. Due to the high power and high efficiency, the PMSM is widely used for industry, vehicles, and the like.

Since there is no winding in the rotor 120 in the PMSM, the rotor 120 may rotate at high speed. Power characteristics of the PMSM may be improved by concentric winding of the stator 100.

However, the PMSM has a problem in which teeth between the stator slots 110 generate cogging torque due to an interaction with the permanent magnets. Cogging torque refers to a torsional force which tries to prevent a rotating body from rotating in a particular direction. Particularly, in no-load or low-load rotation, cogging torque may occur.

In order to eliminate cogging torque, the PMSM may include a clutch configured to block power transmission. However, due to the clutch, a volume, weight, size, cost, and the like may increase.

Meanwhile, since the induction motor does not include permanent magnets, cogging torque is not generated despite a teeth/slot structure of the stator. Since the induction motor does not have cogging torque, a clutch for blocking power transmission is not necessary.

In addition, the induction motor is easily manufactured and mass-produced.

However, the induction motor has a disadvantage of lower torque density in comparison to the PMSM.

Accordingly, there is a need for a device and method for controlling a motor so that the disadvantages of the synchronous motor and the induction motor are compensated for and the advantages of each are utilized.

Meanwhile, in addition to research on controlling a motor itself, research on a method of operating a synchronous motor and an induction motor together in a four-wheel drive vehicle is being performed.

The four-wheel drive vehicle is a vehicle operated by providing driving forces to both front wheels and rear wheels of the vehicle. Particularly, among four-wheel drives, an all-wheel drive (AWD) type is a type that optimizes a grip force of wheels by always distributing a driving force to four wheels and thus can perform stable driving.

A system using any one of front wheels and rear wheels as main drive wheels and the other as auxiliary drive wheels is generally applied to four-wheel drive vehicles. In this case, traction motors for providing power to the main drive wheels and the auxiliary drive wheels are provided, respectively. Each of the traction motors includes an inverter configured to convert DC energy stored in a battery and supply the converted energy to the traction motor. Hereinafter, 'drive' and 'traction' may be used interchangeably.

Since an auxiliary traction motor connected to the auxiliary drive wheel is a motor assisting a traction force, that is, torque of a main traction motor, high torque density is necessary.

For high torque density, the auxiliary traction motor may be a PMSM. However, when the auxiliary traction motor is the PMSM, the torque of the main traction motor may be impeded due to a drag force such as cogging torque. On the other hand, when the auxiliary traction motor is an induction motor, cogging torque does not occur at high-speed driving with low load but there is a limitation in supplementing the starting torque of the main traction motor.

Accordingly, development of a method of controlling the auxiliary traction motor in consideration of the operation of the main traction motor is necessary.

SUMMARY

According to at least one aspect, the present disclosure provides a motor control apparatus for controlling a motor, wherein the motor includes a rotor in which a permanent magnet and a conductor bar are arranged, including an inverter configured to apply a stator current to a stator coil of the motor; and a control unit configured to control a torque of the conductor bar and magnetize or demagnetize the permanent magnet by controlling the stator current through the inverter.

According to another aspect, the present disclosure provides an auxiliary-motor control apparatus for controlling an auxiliary-motor, wherein the auxiliary-motor includes a rotor in which a permanent magnet and a conductor bar are arranged, including an inverter configured to apply a stator current to a stator coil of the auxiliary-motor; and a control unit configured to control a driving mode of the auxiliary-motor by controlling a torque of the conductor bar and magnetizing or demagnetizing the permanent magnet according to operation of a main motor through the inverter.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Embodiments of the present disclosure are directed to providing a motor-controlling apparatus for controlling a motor including both permanent magnets and conducting bars in which a torque by the conducting bars is supplemented with a torque by the permanent magnets so as to increase a torque density and a cogging torque by the permanent magnets is removed without a clutch so as to operate the motor as an induction motor.

Other embodiments of the present disclosure are directed to providing an auxiliary motor-controlling apparatus for controlling an auxiliary motor including both permanent magnets and conducting bars in which a torque of a main motor is assisted by controlling a driving mode of the auxiliary motor according to the operation of the main motor when the main motor is started or accelerates, and a cogging torque by the permanent magnets is removable without a clutch for power cutoff even when power of the auxiliary motor is turned off.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Figure 2:
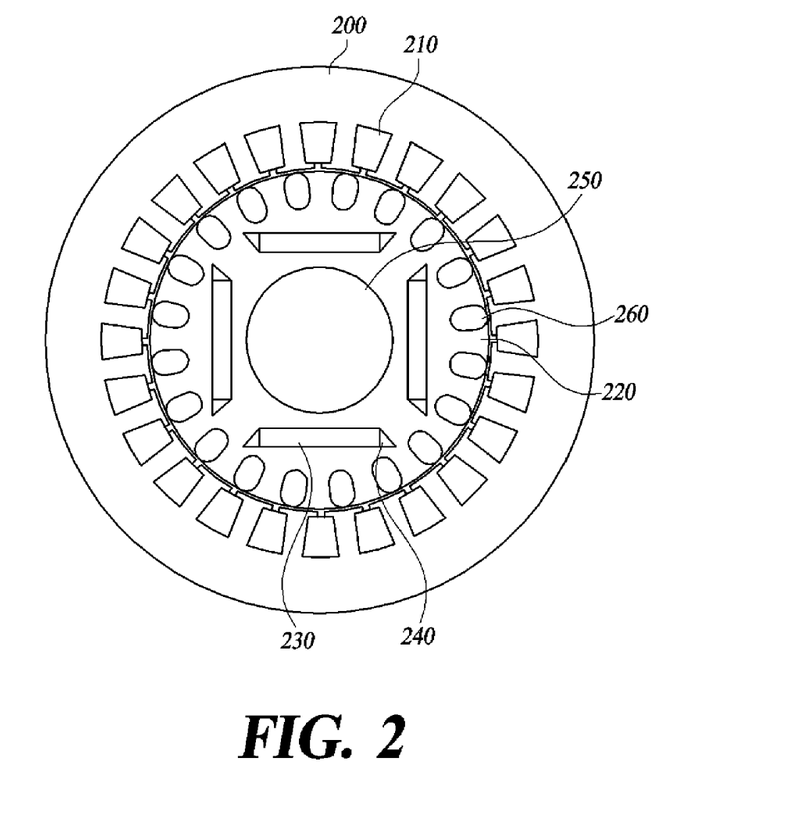
FIG. 2 is a view exemplarily illustrating a structure of a motor including permanent magnets and conductor bars according to one embodiment of the present disclosure.

FIG. 2 is a view exemplarily illustrating a structure of a motor including permanent magnets and conductor bars according to one embodiment of the present disclosure.

Referring to FIG. 2, a cross section of a motor including a stator 200, a stator slot 210, a rotor 220, a permanent magnet 230, a hole 240, a shaft 250, and a conductor bar 260 is illustrated.

The stator 200, the stator slot 210, the rotor 220, the permanent magnet 230, the hole 240, the shaft 250, and the conductor bar 260 which are shown in FIG. 2 operate like a stator 100, a stator slot 110, a rotor 120, a permanent magnet 130, a hole 140, a shaft 150, and a conductor bar 160 which are shown in FIGS. 1A and 1B.

Alternating current (AC) flowing through stator coils forms a rotating magnetic field, and the conductor bars 260 generate a torque by interacting with the rotating magnetic field. The rotor 220 rotates based on the torque generated by the conductor bars 260.

On the other hand, unlike the permanent magnet 130 shown in FIG. 1A, the permanent magnet 230 shown in FIG. 2 may be magnetized or demagnetized by the AC current applied to the stator coil. In particular, a magnetic field formed by d-axis current flowing through the stator coils may magnetize or demagnetize the permanent magnets. Here, magnetization refers to a phenomenon in which an object becomes magnetized due to an external magnetic field. Magnetization has the same meaning as magnetism and magnetizing. On the other hand, demagnetization refers to a phenomenon in which an object having magnetism loses its magnetic pole due to an external magnetic field.

For magnetization and demagnetization, the permanent magnets 230 may be a material having a low coercive force. For example, the permanent magnet 230 may be AlNiCo including aluminum, nickel, and cobalt.

When the permanent magnet 230 is magnetized, the permanent magnet 230 generates a torque due to attraction between the magnetic pole of the permanent magnet 230 and the rotating magnetic field.

When the permanent magnet 230 is magnetized, the motor may use a torque generated by the conductor bar 260 and the torque generated by the permanent magnet 230. As provided herein, a driving mode in which the motor uses both the torque generated by the conductor bar 260 and the torque generated by the permanent magnet 230 is referred to as a hybrid mode. That is, the motor becomes a hybrid motor in which an induction motor including the conductor bar 260 and a synchronous motor including the permanent magnet 230 are combined. Since the motor uses both the torque generated by the conductor bar 260 and the torque generated by the permanent magnet 230 in the hybrid mode, torque density may be increased.

When the permanent magnet 230 is demagnetized, since there is no magnetic pole of the permanent magnet 230 or a degree of magnetization thereof is insignificant, the permanent magnet 230 cannot generate the torque.

When the permanent magnet 230 is demagnetized, the motor may use only the torque generated by the conductor bar 260. That is, the motor operates as an induction motor including only the conductor bar 260. As provided herein, a mode in which the motor uses only the torque generated by the conductor bar 260 is referred to as an induction motor mode. Since there is no magnetic pole of the permanent magnet 230 in the motor in the induction motor mode, cogging torque by the permanent magnet 230 may be removed. In addition, although a clutch configured to block power transmission is not used, the torque of a main motor may be prevented from being impeded by the cogging torque of the permanent magnet 230.

When the motor according to the embodiment of the present disclosure is used as an auxiliary-motor, the motor may increase a torque output for assisting the torque of the main motor through the hybrid mode. Also, a drag force generated by the permanent magnet 230 may be prevented by demagnetizing the permanent magnet 230 in no-load or low-load rotation. This can reduce a loss of energy.

Figure 3:
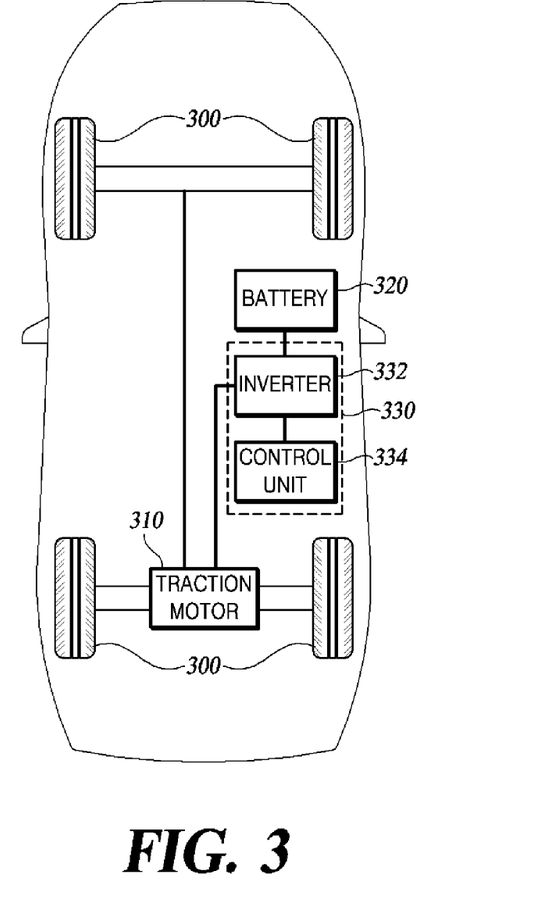
FIG. 3 is a view exemplarily illustrating a motor control apparatus according to one embodiment of the present disclosure.

FIG. 3 is a view exemplarily illustrating a motor control apparatus according to one embodiment of the present disclosure.

Referring to FIG. 3, drive wheels 300, a traction motor 310, a battery 320, a motor control apparatus 330, an inverter 332, and a control unit 334 are shown. Although a rear-wheel drive type is shown in FIG. 3, the motor control apparatus 330 may be applied to a variety of drive types such as a front-wheel drive, a four-wheel drive, and the like.

The drive wheels 300 refer to wheels which receive power from the traction motor 310 and rotate.

The traction motor 310 is configured to provide power to the drive wheels 300 under the control of the motor control apparatus 330.

The traction motor 310 includes a stator and a rotor. The stator includes a stator core and a stator coil wound on the stator core. The rotor includes a permanent magnet and a conductor bar. A plurality of such permanent magnets and a plurality of such conductor bars may be arranged in the rotor.

According to one embodiment of the present disclosure, the permanent magnet may be formed of a magnet having a low coercive force. For example, the permanent magnet may be AlNiCo.

The battery 320 is configured to store electric energy.

The motor control apparatus 330 is an apparatus configured to control the operation of the traction motor 310 using the electric energy stored in the battery 320.

The inverter 332 is configured to convert the electric energy stored in the battery 320 into the form of current using a plurality of switching elements and provide the current to the traction motor 310. In particular, the inverter 332 is configured to apply a stator current to the stator coil of the traction motor 310.

The control unit 334 is configured to magnetize or demagnetize the permanent magnet and control the torque of the conductor bar by controlling the stator current through the inverter 332. When the permanent magnet is magnetized, the control unit 334 may control not only the torque generated by the conductor bar but also the torque generated by the magnetized permanent magnet using a rotating magnetic field formed by controlling the stator current. In this case, the torque density of the traction motor 310 increases and the output torque increases.

The control unit 334 may be configured to form a rotating magnetic field using the stator current, generate the torque at the conductor bar using the rotating magnetic field, and magnetize or demagnetize the permanent magnet.

As a method of controlling the stator current, the control unit 334 may control the inverter 332 to allow a multi-phase current to flow through the stator coil. Here, the multi-phase current may refer to a U-phase current, a V-phase current, and a W-phase current on UVW coordinates on the basis of a phase angle.

The control unit 334 may convert a current on the UVW coordinates into a d-axis current and a q-axis current on d/q coordinates. The d-axis current refers to a current having the same phase as that of a magnetic flux axis of a permanent magnet of the traction motor 310, and the q-axis current refers to a current having a phase that is orthogonal to the magnetic flux axis of the permanent magnet.

The control unit 334 may be configured to control the magnetization or demagnetization of the permanent magnet by controlling the d-axis current. For the magnetization or demagnetization of the permanent magnet, the d-axis current having a high level is instantaneously applied to the stator coil.

According to one embodiment of the present disclosure, the control unit 334 may be configured to magnetize the permanent magnet by controlling the d-axis current of the stator current to be a positive value. The control unit 334 may generate a magnetomotive force greater than or equal to the coercive force of the permanent magnet by controlling the d-axis current to be a high positive value. The magnitude of the magnetomotive force may be a level for forming a rotating magnetic field corresponding to the magnetic saturation of the permanent magnet.

According to another embodiment of the present disclosure, the control unit 334 may be configured to demagnetize the permanent magnet by controlling the d-axis current of the stator current to be a negative value. The control unit 334 may generate a magnetomotive force greater than or equal to the coercive force of the permanent magnet by controlling the d-axis current to be a high negative value. The magnitude of the magnetomotive force may be a level for forming a rotating magnetic field corresponding to the coercive force of the permanent magnet.

When the permanent magnet is magnetized, the motor control apparatus 330 may be configured to control the traction motor 310 to be in a hybrid mode in which the induction motor and the synchronous motor are combined. In the hybrid mode, both the torque by the magnetized permanent magnet and the torque by the conductor bar are generated. In the hybrid mode, the traction motor 310 has high torque density and high output torque. When the motor accelerates, the hybrid mode may be used.

When the permanent magnet is magnetized, the motor control apparatus 330 may be configured to control the traction motor 310 to be in a synchronous motor mode. The motor control apparatus 330 may operate the traction motor 310 as the synchronous motor by synchronizing the rotating magnetic field with a magnetic pole of the magnetized permanent magnet. The synchronous motor mode has high torque density and high output torque in comparison to an induction motor mode. When the motor accelerates, the synchronous mode may be used.

When the permanent magnet is not magnetized or is demagnetized, the motor control apparatus 330 may be configured to control the traction motor 310 to be in an induction motor mode. Since only the torque generated by the conductor bar is applied to the traction motor 310 when the permanent magnet is demagnetized, a torque density is lower but a cogging torque or a drag force may be eliminated. Accordingly, the energy efficiency of the traction motor 310 may be increased.

Figure 4:
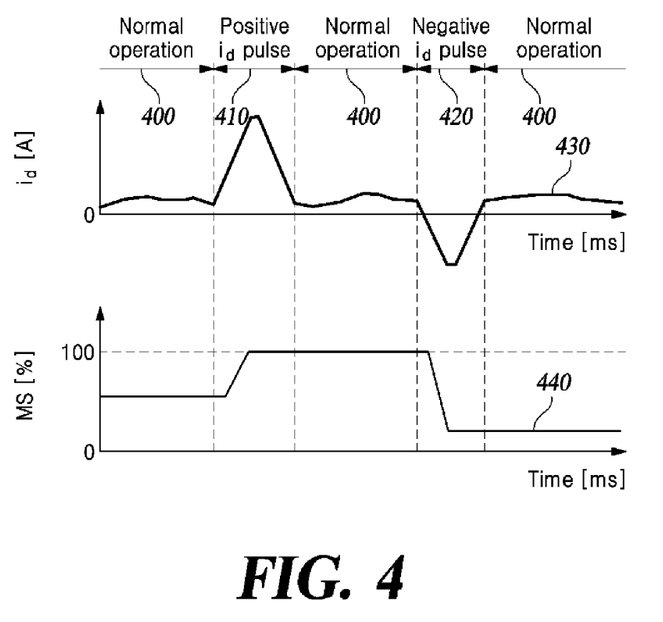
FIG. 4 is a view exemplarily illustrating a change in magnetic property of the permanent magnet according to d-axis current control according to one embodiment of the present disclosure.

FIG. 4 is a view exemplarily illustrating a change in magnetic property of the permanent magnet according to d-axis current control according to one embodiment of the present disclosure.

Referring to FIG. 4, a normal operation section 400, a magnetization section 410, a demagnetization section 420, a d-axis current 430, and a magnetization state (MS) 440 are shown.

The normal operation section 400 refers to a section in which magnetization and demagnetization of the permanent magnet are not performed. In the normal operation section 400, the motor control apparatus controls the d-axis current 430 within a range necessary for controlling a torque.

The magnetization section 410 refers to a section in which the permanent magnet is magnetized. In the magnetization section 410, the motor control apparatus may magnetize the permanent magnet by controlling the d-axis current at the stator coil of the motor to be a positive value. Here, the d-axis current may be instantaneously controlled to be a high positive value. The magnetization state 440 in the magnetization section 410 may be 100% or close to 100%.

The demagnetization section 420 refers to a section in which the permanent magnet is demagnetized. In the demagnetization section 420, the motor control apparatus may demagnetize the permanent magnet by controlling the d-axis current at the stator coil of the motor to be a negative value. Here, the d-axis current may be instantaneously controlled to be a high negative value. The demagnetization state 440 in the demagnetization section 420 may be 0% or close to 0%.

Figure 5:
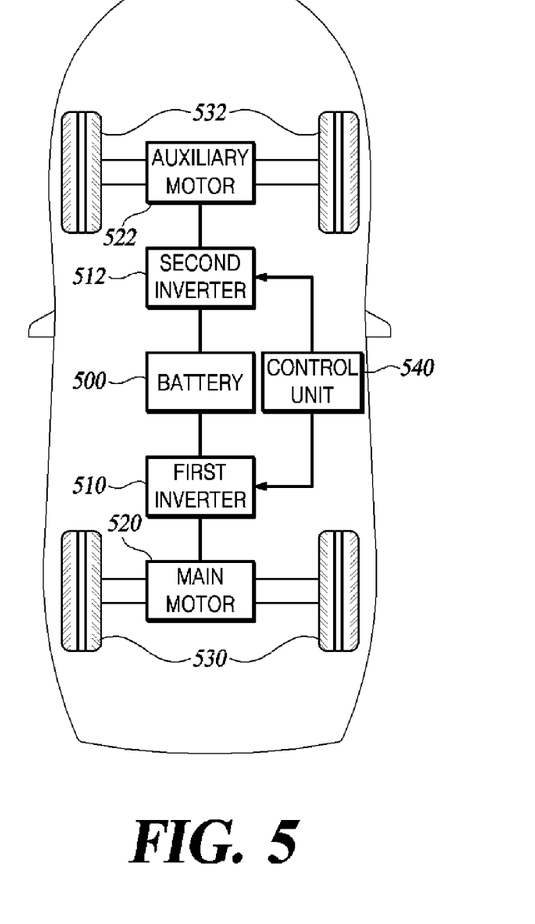
FIG. 5 is a view exemplarily illustrating an auxiliary-motor control apparatus for controlling an auxiliary-motor according to operation of a main motor according to one embodiment of the present disclosure.

FIG. 5 is a view exemplarily illustrating an auxiliary-motor control apparatus for controlling an auxiliary-motor according to operation of a main motor according to one embodiment of the present disclosure.

Referring to FIG. 5, a battery 500, a first inverter 510, a second inverter 512, a main motor 520, an auxiliary-motor 522, main drive wheels 530, auxiliary drive wheels 532, and a control unit 540 are shown. According to one embodiment of the present disclosure, the auxiliary-motor control apparatus may include the second inverter 512 and the control unit 540 and may further include other components shown in FIG. 5.

The battery 500 is configured to store electric energy.

The first inverter 510 and the second inverter 512 are configured to convert electric energy stored in the battery 500 into the form of current using a plurality of switching elements and to provide the current to the main motor 520 and the auxiliary-motor 522, respectively. In particular, the first inverter 510 is configured to apply a stator current to a stator coil of the main motor 520, and the second inverter 512 is configured to apply a stator current to a stator coil of the auxiliary-motor 522. The inverters convert a DC voltage applied from the battery 500 into an AC three-phase voltage using an insulated gate bipolar transistor (IGBT) that is a switching device to drive the motors.

The main motor 520 is configured to provide a relatively larger proportion of the power necessary for vehicle driving.

The main motor 520 may be implemented as an engine in a hybrid vehicle.

The auxiliary-motor 522 is configured to provide a relatively smaller proportion of the power necessary for vehicle driving.

According to one embodiment of the present disclosure, the auxiliary-motor 522 includes a stator and a rotor. The rotor of the auxiliary-motor 522 includes a permanent magnet and a conductor bar. The auxiliary-motor 522 includes A plurality of such permanent magnets and a plurality of such conductor bars.

The main drive wheels 530 are drive wheels driven by a relatively larger proportion of the power necessary for vehicle driving. The auxiliary drive wheels 532 are drive wheels driven by a relatively smaller proportion of the power necessary for vehicle driving.

The main drive wheels 530 and the auxiliary drive wheels 532 may be front wheels and rear wheels, respectively or may be rear wheels and front wheels, respectively.

The control unit 540 calculates a torque for power distribution to the front wheels and rear wheels and controls overall operations for controlling the driving of the main motor 520 and the auxiliary-motor 522. The control unit 540 controls the auxiliary-motor 522 through the second inverter 512. The control unit 540 may control the main motor 520 through the first inverter 510.

According to one embodiment of the present disclosure, the control unit 540 is configured to control the torque of the conductor bar included in the rotor of the auxiliary-motor 522, and magnetize or demagnetize the permanent magnet according to the operation of the main motor 520 so as to control a driving mode of the auxiliary-motor. When the permanent magnet is magnetized, the control unit 334 may be configured to control not only the torque generated by the conductor bar of the auxiliary-motor 522 but also the torque generated by the magnetized permanent magnet using a rotating magnetic field formed by controlling the stator current of the auxiliary-motor 522.

The control unit 540 may be configured to control the driving mode of the auxiliary-motor 522 to be an induction motor mode by demagnetizing the permanent magnet of the auxiliary-motor 522 while the permanent magnet is not magnetized when the main motor 520 is started. Here, the induction motor mode refers to a mode in which the control unit 540 operates the auxiliary-motor as an induction motor. In the induction motor mode, the control unit 540 controls a torque by the conductor bar. Meanwhile, the control unit 540 may demagnetize the permanent magnet while a vehicle is driving and may control a driving mode of the auxiliary-motor 522 to be an induction motor mode.

The control unit 540 may be configured to control the driving mode of the auxiliary-motor 522 to be a hybrid mode by magnetizing the permanent magnet of the auxiliary-motor 522 when the main motor 520 accelerates. Here, the hybrid mode refers to a mode in which the control unit 540 generates a torque by the magnetized permanent magnet and a torque by the conductor bar. The control unit 540 may control the driving mode of the auxiliary-motor 522 to be the hybrid mode even when the main motor 520 is started when a large torque is necessary.

The control unit 540 may be configured to control the driving mode of the auxiliary-motor 522 as a synchronous motor mode by magnetizing the permanent magnet of the auxiliary-motor 522 when the main motor 520 accelerates. Here, the synchronous motor mode refers to a mode in which the control unit 540 operates the auxiliary-motor as a synchronous motor. In the synchronous motor mode, the control unit 540 controls a torque by the permanent magnet.

When the main motor 520 is at constant speed or decelerates, the control unit 540 may be configured to demagnetize the permanent magnet before power supply to the auxiliary-motor 522 is stopped.

In particular, the control unit 540 may turn off power to the auxiliary-motor 522 according to the operation of the main motor 520 and may demagnetize the permanent magnet of the auxiliary-motor 522 before power is turned off. For example, when a vehicle is driving using only the torque of the main motor 520, the power of the auxiliary-motor 522 may be turned off. Here, when the power of the auxiliary-motor 522 is turned off, the auxiliary-motor 522 rotates in any one of idle rotation, no-load rotation, and low-load rotation according to rotation of the main motor 520. When the permanent magnet of the auxiliary-motor 522 is magnetized, even when the power to the auxiliary-motor 522 is turned off, cogging torque, that is, a drag force, may be generated by the permanent magnet. The drag force is a factor hindering the torque of the main motor 520. The control unit 540 may eliminate the drag force by demagnetizing the permanent magnet of the auxiliary-motor 522 before the power of the auxiliary-motor 522 is turned off.

Meanwhile, the operation of the control unit included in the motor control apparatus may be implemented with computer-readable code in a computer-readable recording medium. The computer-readable recording medium includes all types of recording media in which data readable by a computer system is stored. That is, the computer-readable recording medium includes non-transitory media such as a read-only memory (ROM), a random-access memory (RAM), a compact disc ROM (CD-ROM), a magnetic tape, a floppy disk, an optical data storage device, and the like. Also, in the computer-readable recording medium distributed in computer systems over a network, computer-readable codes may be stored and executed in a distributed manner.

Also, the components of the present disclosure may use an integrated circuit structure such as a memory, a processor, a logic circuit, a look-up table, and the like. The integrated circuit structure performs each function described in the present specification by controlling one or more microprocessors or other control devices. Also, the components of the present disclosure may be specifically implemented by a part of a program or code including one or more executable instructions for performing a particular logic function or executed by one or more microprocessors or other control devices. Also, the components of the present disclosure may include or be implemented by a central processing unit (CPU), a microprocessor, and the like which performs respective functions thereof. Also, the components of the present disclosure may store instructions executed by one or more processors in one or more memories.

As described above, according to one embodiment of the present disclosure, in a motor control apparatus for controlling a motor including both permanent magnets and conductor bars, torque by the conductor bars can be supplemented with torque by the permanent magnets so as to increase torque density, and cogging torque by the permanent magnets can be removed without a clutch so as to operate the motor as an induction motor.

According to another embodiment of the present disclosure, in an auxiliary-motor control apparatus for controlling an auxiliary-motor including both permanent magnets and conductor bars, torque of the main motor can be assisted by controlling a driving mode of the auxiliary-motor according to the operation of the main motor when the main motor is started or accelerates, and cogging torque by the permanent magnets can be removable without a clutch for power cutoff even when power of the auxiliary-motor is turned off.

Although exemplary embodiments of the present disclosure have been described for illustrative purposes, those skilled in the art will appreciate that various modifications, additions, and substitutions are possible, without departing from the idea and scope of the claimed disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the claimed disclosure is not to be limited by the above explicitly described embodiments but by the claims and equivalents thereof.

What is claimed is:

1. A motor control apparatus for controlling a motor, wherein the motor includes a rotor in which a permanent magnet and a conductor bar are arranged, the motor control apparatus comprising:
    an inverter configured to apply a stator current to a stator coil of the motor; and
    a control unit configured to control a torque of the conductor bar and magnetize or demagnetize the permanent magnet by controlling the stator current through the inverter;
    wherein the control unit is configured to magnetize the permanent magnet by controlling a d-axis current of the stator current to be a positive value.

2. The motor control apparatus of claim 1, wherein the control unit is configured to control a torque generated by the magnetized permanent magnet using the stator current.

3. The motor control apparatus of claim 1, wherein the control unit is configured to demagnetize the permanent magnet by controlling a d-axis current of the stator current to be a negative value.

4. An auxiliary-motor control apparatus for controlling an auxiliary-motor, wherein the auxiliary-motor includes a rotor in which a permanent magnet and a conductor bar are arranged, the auxiliary-motor control apparatus comprising:
    an inverter configured to apply a stator current to a stator coil of the auxiliary-motor; and
    a control unit configured to control a driving mode of the auxiliary-motor by controlling a torque of the conductor bar and magnetizing or demagnetizing the permanent magnet according to operation of a main motor through the inverter.

5. The auxiliary-motor control apparatus of claim 4, wherein the control unit is configured to control the driving mode to be an induction motor mode in which the auxiliary-motor operates as an induction motor while the permanent magnet is not magnetized when the main motor is started.

6. The auxiliary-motor control apparatus of claim 4, wherein the control unit is configured to magnetize the permanent magnet and control the driving mode to be a hybrid mode in which a torque by the magnetized permanent magnet and the torque by the conductor bar are generated when the main motor accelerates.

7. The auxiliary-motor control apparatus of claim 4, wherein the control unit is configured to magnetize the permanent magnet and control the driving mode to be a synchronous motor mode in which the auxiliary-motor operates as a synchronous motor when the main motor accelerates.

8. The auxiliary-motor control apparatus of claim 4, wherein the control unit is configured to demagnetize the permanent magnet before power supply to the auxiliary-motor is stopped when the main motor is at constant speed or decelerates.

* * * * *